United States Patent [19]

Lin

[11] Patent Number: 5,199,284
[45] Date of Patent: Apr. 6, 1993

[54] LOCK DEVICE FOR A STEERING WHEEL IN AN AUTOMOBILE

[76] Inventor: Chuan-Chuan Lin, I-Hsiu No. 148, I-Hsiu Li, Hsueh-Chia Chen, Tainan Hsien, Taiwan

[21] Appl. No.: 867,462

[22] Filed: Apr. 13, 1992

[51] Int. Cl.$^5$ .............................................. B60R 25/02
[52] U.S. Cl. ....................................... 70/209; 70/226; 70/238
[58] Field of Search .................. 70/209, 211, 212, 225, 70/226, 237, 238

[56] References Cited

U.S. PATENT DOCUMENTS

| | | | |
|---|---|---|---|
| 1,429,334 | 9/1922 | Furber | 70/209 |
| 4,747,279 | 5/1988 | Solow | 70/211 |
| 4,825,671 | 5/1989 | Wu | 70/211 |
| 5,024,069 | 6/1991 | Hull, Jr. et al. | 70/226 |
| 5,031,429 | 7/1991 | Wang | 70/209 |
| 5,040,388 | 8/1991 | Chen | 70/226 |
| 5,097,685 | 3/1992 | Lien | 70/211 |

FOREIGN PATENT DOCUMENTS 2639591 6/1990 France ..................... 70/226

*Primary Examiner*—Richard E. Moore
*Assistant Examiner*—D. Boucher
*Attorney, Agent, or Firm*—Cushman, Darby & Cushman

[57] ABSTRACT

A lock device locks a steering wheel in an automobile and has a retaining plate unit which includes an elongated plate body covering two diametrically opposed portions of the rim of the steering wheel, a fixed pawl member fixed on the plate body, and a movable pawl member mounted axially movably on the plate body. A blocking rod is mounted axially movably on the plate body. A locking mechanism locks the blocking rod releasably in one of several first selected positions on the retaining plate unit so as to extend a portion of the blocking rod from an end of the retaining plate unit. A key plug unit is disposed on the retaining plate unit so as to lock the movable pawl member releasably in one of several second selected positions on the retaining plate unit.

2 Claims, 4 Drawing Sheets

LOCK DEVICE FOR A STEERING WHEEL IN AN AUTOMOBILE

BACKGROUND OF THE INVENTION

1. Field of the Invention

This invention relates to a lock device for an automobile, more particularly to a lock device which covers and protects two diametrically opposed portions of the rim of the steering wheel in the automobile.

2. Description of the Related Art

It is well-known in the art that a conventional lock device has a J-shaped end portion which hooks over the rim of a steering wheel. The rim of the steering wheel may be broken by means of a saw or the like so as to remove the J-shaped end portion of the lock device from the steering wheel. As a result, the steering wheel can be rotated. In this way, a thief can steal a car in which the conventional lock device is incorporated.

SUMMARY OF THE INVENTION

It is therefore the main object of this invention to provide a lock device which covers and protects two diametrically opposed portions of the rim of the steering wheel in the automobile.

According to this invention, a lock device locks a steering wheel in an automobile and has a retaining plate unit which includes an elongated plate body covering two diametrically opposed portions of the rim of the steering wheel, a fixed pawl member fixed on the plate body, and a movable pawl member mounted axially movably on the plate body. A blocking rod is mounted axially movably on the plate body. A locking mechanism locks the blocking rod releasably in one of several first selected positions on the retaining plate unit so as to extend a portion of the blocking rod from an end of the retaining plate unit. A key plug unit is disposed on the retaining plate unit so as to lock the movable pawl member releasably in one of several second selected positions on the retaining plate unit.

In an embodiment, the locking mechanism includes a guide tube mounted securely on the retaining plate unit, a row of notches formed in the blocking rod, a blind hole formed in the guide tube in communication with the central bore of the guide tube, and a retaining piece mounted removably within the blind hole of the guide tube and selectively engaged within one of the notches of the guide tube. When the lock device is in use, the open end of the blind hole is closed by the rim of the steering wheel so as to conceal the retaining piece in the guide tube, thereby preventing the retaining piece from being accessed. The plate body of the retaining plate unit has a restricting slide slot formed therein and a retaining hole formed through the plate body. The movable pawl member has a sliding body confined and slidable in the restricting slide slot, and an L-shaped holding arm mounted pivotally on the sliding body. The L-shaped holding arm extends through the retaining hole of the plate body and is locked on the plate body by means of the key plug unit. When unlocking the L-shaped holding arm of the movable pawl member from the key plug unit, the L-shaped holding arm of the movable pawl member can be turned so as to disengage from the retaining hole of the plate body.

BRIEF DESCRIPTION OF THE DRAWING

Other features and advantages of this invention will become apparent in the following detailed description of a preferred embodiment of this invention, with reference to the accompanying drawings, of which.

DETAILED DESCRIPTION OF THE PREFERRED EMBODIMENTS

Figure 1:
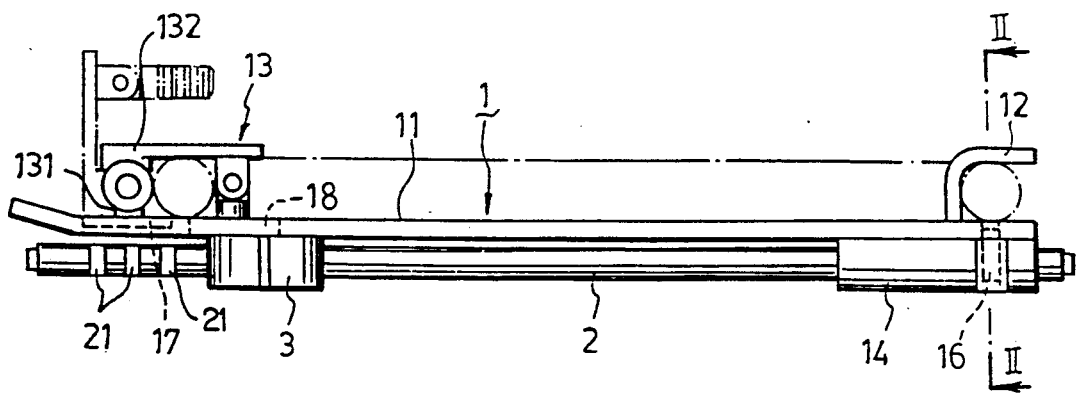
FIG. 1 is a side view of a lock device for the steering wheel of an automobile according to this invention.
Figure 2:
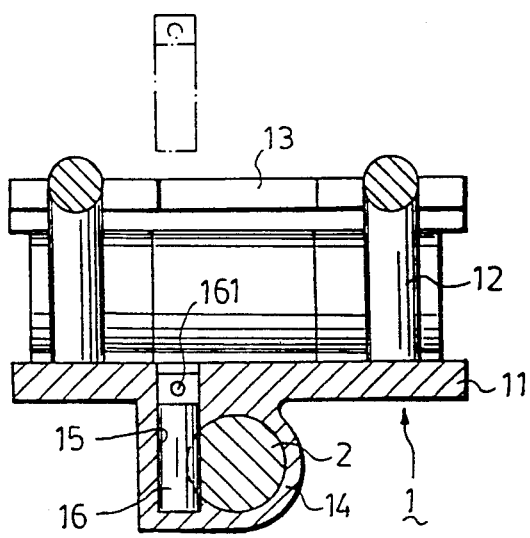
FIG. 2 is a sectional view taken along Line II—II in FIG. 1.

Referring to FIGS. 1 and 2, a lock device of this invention includes a retaining plate unit (1), a blocking rod (2) and a key plug unit (3).

The retaining plate unit (1) includes a plate body (11), a fixed pawl member (12), a movable pawl member (13), and a fixed guide tube (14).

Figure 3:
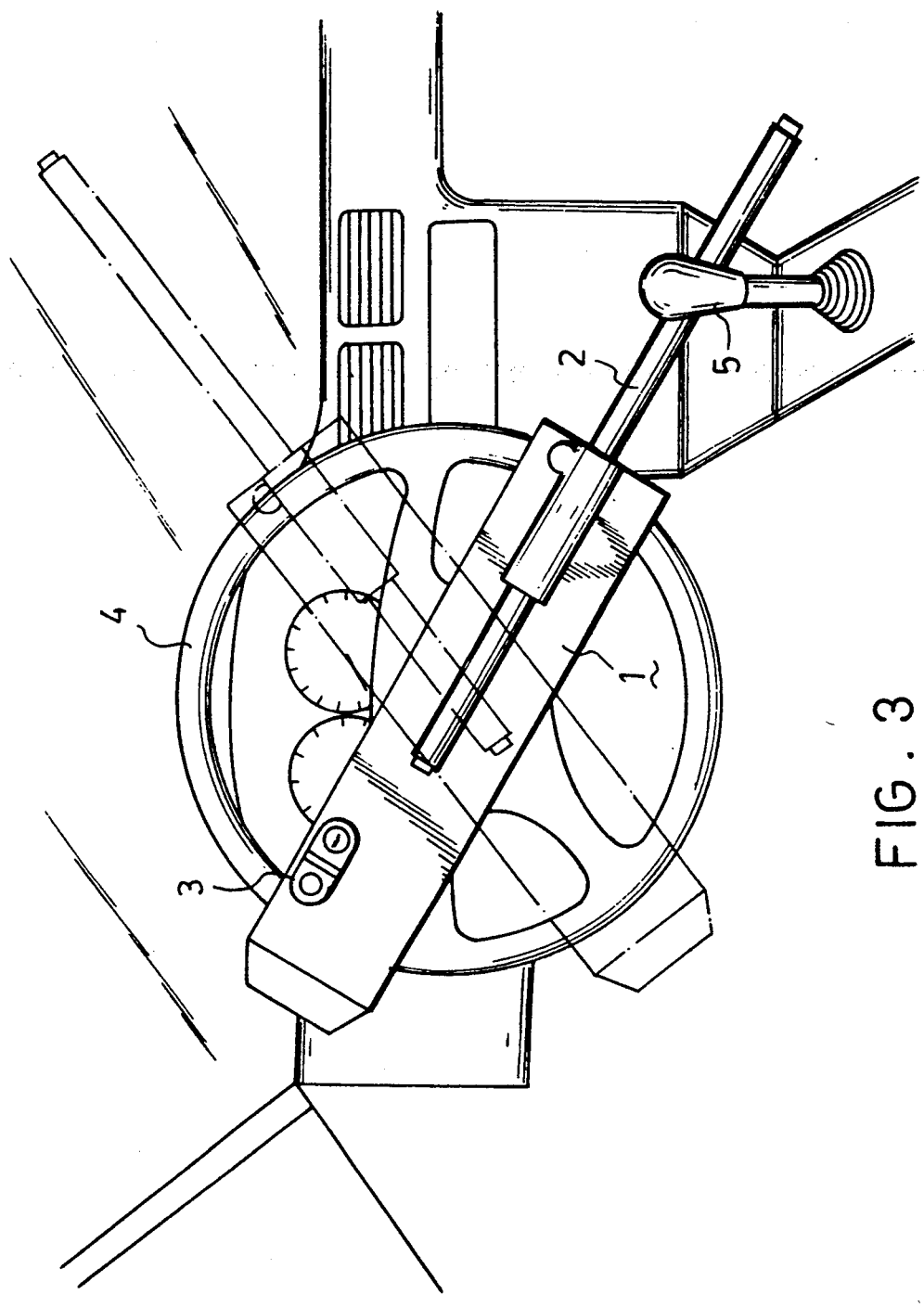
FIG. 3 is a schematic view illustrating automatic positioning of the lock device according to this invention.
Figure 4:
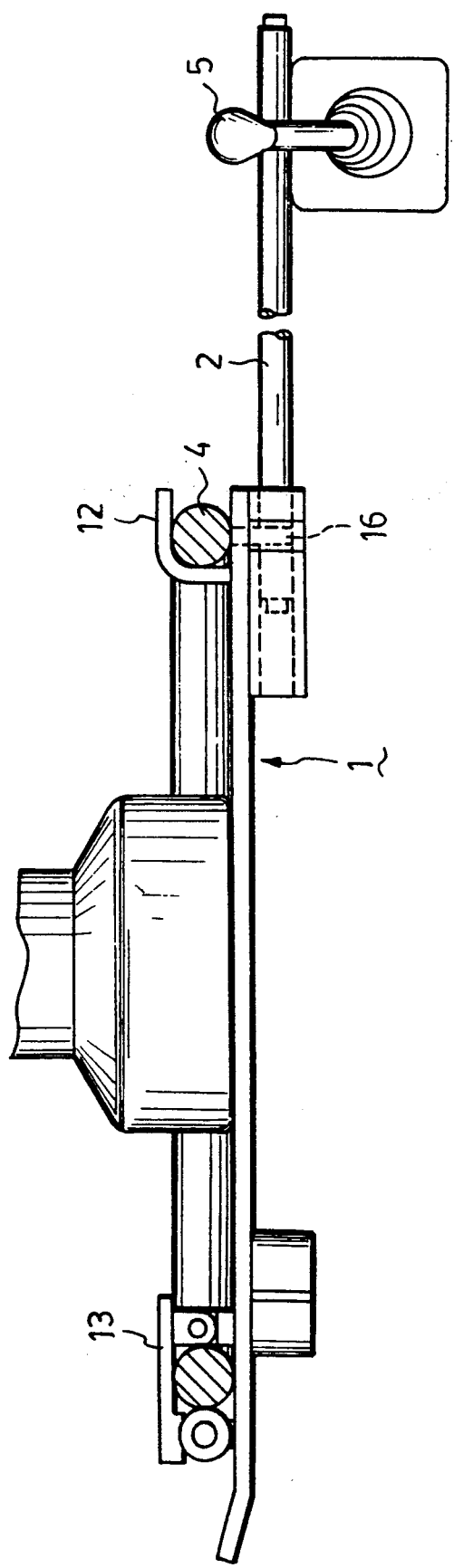
FIG. 4 is a top view illustrating how to mount the lock device in an automobile in accordance with this invention.

A blind hole (15) is formed in the guide tube (14) in communication with the central bore of the guide tube (14) and has an open end facing toward the rim of the steering wheel. A retaining piece (16) is placed in the blind hole (15) and is selectively engaged within one of several aligned notches (21) of the blocking rod (2) so as to extend the blocking rod (2) from an end of the retaining plate body (1) to the position shown in FIG. 3, where the gravity of the lock device falls at the end portion of the retaining plate unit (1) from which the blocking rod (2) extends. As shown in FIG. 3, in a case where the lock device is placed in the position indicated by the phantom lines, the action of gravity makes the assembly of the steering wheel and the lock device automatically turn to the position indicated by the solid lines, where the blocking rod (2) is blocked by the brake lever (5). Accordingly, the lock device can be automatically positioned relative to the steering wheel. As shown in FIG. 4, in use, the open end of the blind hole (15) is closed by the rim (4) of the steering wheel so that the retaining piece (16) cannot be taken from the blind hole (15) unless the lock device is removed from the steering wheel. The retaining piece (16) has a hole (161) formed therethrough. The end of an associated hook can be moved into the hole (161) of the retaining piece (16) so as to take the retaining piece (16) from the hole (161) in the case where the lock device is removed from the steering wheel.

The movable pawl member (13) includes a sliding body (131) confined and slidable in the restricting slide slot (17) of the plate body (11), and an L-shaped holding arm (132) mounted pivotally on the sliding body (131). As shown in FIG. 1, the holding arm (132) can be turned from the position indicated by the phantom lines to that indicated by the solid lines so as to extend through the retaining hole (18) of the plate body (11) and be locked on the key plug unit (3), thereby holding the rim (4) of the steering wheel between the fixed pawl member (13) and the plate body (11).

Figure 5:
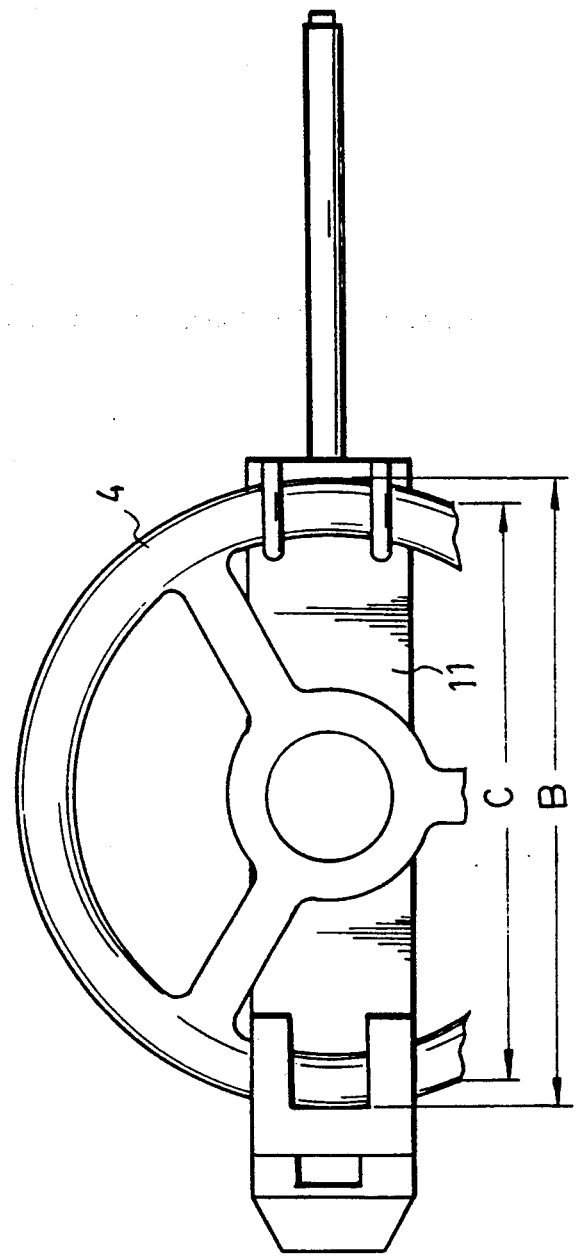
FIG. 5 is a schematic view illustrating the assembly of the lock device and a broken steering wheel.

Referring to FIG. 5, because the diametrically opposed portions (B) of the steering wheel are covered by the lock device, when an area (C) of the steering wheel is removed from the remaining portion of the steering wheel by a saw or the like, the lock device cannot be taken from the steering wheel without the assistance of tools. Accordingly, it is difficult for a thief to steal a car in which the lock device is incorporated.

With this invention thus explained, it is apparent that numerous modifications and variations can be made without departing from the scope and spirit of this invention. It is therefore intended that this invention be limited only as indicated in the appended claims.

I claim:

1. A lock device for a steering wheel in an automobile, comprising:

a retaining plate unit including an elongated plate body adapted to cover upper surfaces of two diametrically opposed portions of a rim of the steering wheel, a fixed pawl member fixed on said plate body, and a movable pawl member mounted axially movably on said plate body, said plate body having a restricted slide slot formed therein and a retaining hole formed therethrough, said movable pawl member having a sliding body confined and slidable in aid restricting slide slot, and an L-shaped holding arm mounted pivotally on said sliding body, said L-shaped holding arm extending through said retaining hole of said plate body;

a blocking rod mounted axially movably on said plate body said blocking rod having a row of notches;

a locking mechanism locking said blocking rod releasibly in one of several first selected positions on said retaining plate unit so as to extend a portion of said blocking rod from an end of said retaining plate unit including;

a guide tube mounted securely on said retaining plate unit and having a central bore through which said blocking rod extends; said guide tube having a blind hole, said blind hole in communication with said central bore of said guide tube and having an open end facing toward the rim of the steering wheel when said lock device is mounted on the steering wheel;

a retaining piece mounted removably within said blind hole of said guide tube and selectively engaged within one of said notches of said guide tube;

whereby, when said lock device is mounted on the steering wheel, said open end of said blind hole is closed by the rim of the steering wheel so that said retaining piece cannot be accessed; and a key plug unit disposed on said retaining plate unit which engages the L-shaped holding arm of said movable pawl member so as to lock said L-shaped holding arm of said movable pawl member releasably in one of several second selected positions on said retaining plate unit, said key plug unit being disengaged from the L-shaped holding arm of said movable pawl member when a key is inserted into said key plug unit and turned thereby unlocking said key plug unit;

whereby, when unlocking said key plug unit said I-shaped holding arm of said movable pawl member is disengaged from said key plug unit such that said L-shaped holding arm of said movable pawl member can be turned so as to disengage said L-shaped holding arm from said retaining hole of said plate body.

2. A lock device as claimed in claim 1, wherein:

said two diametrically opposed portions of the rim of the steering wheel are held by said fixed pawl member and said movable pawl member, respectively, so as to lock to lock device on the rim of the steering wheel;

a lower end of said blocking rod abuts against a brake lever so as to prevent said blocking rod from turning continuously downward;

one of two said diametrically opposed portions of the rim of the steering wheel is positioned between said fixed pawl member and said plate body, while the other is positioned between said movable pawl member and said plate body.

* * * * *